(12) United States Patent
    Li

(10) Patent No.:    US 12,661,566 B1
(45) Date of Patent:     Jun. 23, 2026

(54) ICE HOCKEY PUCK, CHARGING DEVICE AND ICE HOCKEY PUCK KIT

(71) Applicant: Shufang Li, Guangzhou (CN)

(72) Inventor: Shufang Li, Guangzhou (CN)

( * ) Notice: Subject to any disclaimer, the term of this patent is extended or adjusted under 35 U.S.C. 154(b) by 0 days.

(21) Appl. No.: 19/317,385

(22) Filed: Sep. 3, 2025

(30) Foreign Application Priority Data

Aug. 13, 2025    (CN) .......................... 202521730348.6

(51) Int. Cl.
     *A63B 67/14*      (2006.01)
     *A63B 69/00*      (2006.01)
     *H02J 7/70*      (2026.01)

(52) U.S. Cl.
     CPC .......... *A63B 67/14* (2013.01); *A63B 69/0026* (2013.01); *H02J 7/731* (2026.01); *A63B 2220/801* (2013.01); *A63B 2220/833* (2013.01); *A63B 2225/74* (2020.08)

(58) Field of Classification Search
     CPC ........... A63B 69/0024; A63B 69/0026; A63B 2225/74; A63B 2220/833; A63B 43/002
     USPC ................................................. 473/570, 588
     See application file for complete search history.

(56) References Cited

U.S. PATENT DOCUMENTS

| | | | | |
|---|---|---|---|---|
| 4,846,475 A | * | 7/1989 | Newcomb .............. | A63B 67/14 |
| | | | | 473/570 |
| 4,968,036 A | * | 11/1990 | Von Der Mark ...... | A63B 67/14 |
| | | | | 473/570 |
| 5,207,720 A | * | 5/1993 | Shepherd ............... | A63B 67/14 |
| | | | | 473/588 |
| 5,284,343 A | * | 2/1994 | Bigornia ............ | A63B 21/0618 |
| | | | | 473/588 |
| 5,472,193 A | * | 12/1995 | Everman ................ | A63B 67/14 |
| | | | | 473/588 |
| 5,564,698 A | * | 10/1996 | Honey .................. | G01S 3/7864 |
| | | | | 473/588 |
| 5,733,213 A | * | 3/1998 | Colarusso .............. | A63B 67/14 |
| | | | | 473/588 |
| 6,126,561 A | * | 10/2000 | Mark ..................... | A63B 67/14 |
| | | | | 473/588 |
| 6,723,013 B2 | * | 4/2004 | Ilcisin ................... | A63H 33/26 |
| | | | | 473/570 |
| 7,621,833 B2 | * | 11/2009 | Proulx .................. | A63B 67/14 |
| | | | | 473/588 |
| 7,967,464 B2 | * | 6/2011 | Ratmansky ............ | A63B 67/14 |
| | | | | 206/8 |

(Continued)

*Primary Examiner* — Joseph B Baldori
(74) *Attorney, Agent, or Firm* — Law Offices of Sandy Lipkin; Sandy Lipkin

(57)            ABSTRACT

An ice hockey puck, a charging device and an ice hockey puck kit relate to the field of sports equipment for ice hockey. The ice hockey puck includes a housing, a light-emitting device, a power source and a magnetic induction switch. At least a portion of the housing is capable of transmitting light. The light-emitting device is arranged in the housing. The light-emitting device is capable of emitting light to the outside through a light-transmitting portion of the housing. The light-emitting device is electrically connected to the power source. The magnetic induction switch is arranged in the housing. The magnetic induction switch is electrically connected to the power source. The magnetic induction switch is configured for controlling conduction or cutoff of circuits between the light-emitting device and the power source according to changes of external magnetic field.

11 Claims, 10 Drawing Sheets

(56) References Cited

U.S. PATENT DOCUMENTS

| | | | | |
|---|---|---|---|---|
| 8,727,918 | B1 * | 5/2014 | Gentile | A63B 43/06 |
| | | | | 473/588 |
| 8,870,690 | B2 * | 10/2014 | Krysiak | A63B 24/0021 |
| | | | | 473/603 |
| 9,463,360 | B1 * | 10/2016 | Richard | A63B 43/06 |
| 9,597,569 | B2 * | 3/2017 | Pederson | A63B 67/14 |
| 10,016,669 | B2 * | 7/2018 | Mason | A63B 71/06 |
| 10,343,042 | B2 * | 7/2019 | Mason | A63B 24/0021 |
| 10,434,397 | B2 * | 10/2019 | Kounellas | A63B 63/004 |
| 10,507,374 | B2 * | 12/2019 | Kounellas | A63B 67/14 |
| 10,537,778 | B2 * | 1/2020 | Mayer, II | A63B 21/0605 |
| 10,675,512 | B2 * | 6/2020 | Corbeil | A63B 41/08 |
| 11,000,750 | B2 * | 5/2021 | Kounellas | A63B 63/004 |
| 11,202,949 | B2 * | 12/2021 | Hall | A63B 43/00 |
| 11,344,778 | B2 * | 5/2022 | Mason | A63B 67/14 |
| 11,395,953 | B2 * | 7/2022 | Kounellas | A63B 63/004 |
| 11,504,594 | B1 * | 11/2022 | Czech | H02J 50/10 |
| 11,633,653 | B2 * | 4/2023 | Czech | F21V 33/008 |
| | | | | 473/570 |
| 11,660,515 | B1 * | 5/2023 | Walker-Stern | A63B 69/0026 |
| | | | | 473/570 |
| 11,766,599 | B2 * | 9/2023 | Kounellas | A63B 63/004 |
| | | | | 473/471 |
| 11,806,601 | B1 * | 11/2023 | Fowler | A63B 71/0669 |
| 11,872,457 | B2 * | 1/2024 | Hall | A63B 71/06 |
| 11,878,227 | B2 * | 1/2024 | Wang | A63B 69/0026 |
| 12,023,563 | B1 * | 7/2024 | Walker-Stern | A63B 71/06 |
| 12,290,728 | B2 * | 5/2025 | Mason | A63B 43/00 |
| 12,350,564 | B2 * | 7/2025 | Hall | A63B 24/0021 |
| 2012/0295774 | A1 * | 11/2012 | Dalebout | A63B 21/00058 |
| | | | | 482/106 |
| 2013/0314055 | A1 * | 11/2013 | Van Der Linde | H01H 13/18 |
| | | | | 320/167 |
| 2016/0158619 | A1 * | 6/2016 | Polstein | A63B 59/50 |
| | | | | 473/457 |
| 2020/0330850 | A1 * | 10/2020 | Houlihan | A63B 71/0669 |
| 2022/0088460 | A1 * | 3/2022 | Roberts, II | A63B 67/14 |
| 2022/0323842 | A1 * | 10/2022 | Ibragimov | A63B 71/0622 |
| 2022/0409973 | A1 * | 12/2022 | Gaudreau | A63B 67/14 |
| 2023/0191220 | A1 * | 6/2023 | Czech | A63B 69/0026 |
| | | | | 473/570 |
| 2023/0269849 | A1 * | 8/2023 | Elliott | H05B 45/20 |
| 2023/0310965 | A1 * | 10/2023 | Jacobsen | A63F 7/0017 |
| 2023/0381619 | A1 * | 11/2023 | Roberts, II | A63B 67/14 |
| 2024/0075367 | A1 * | 3/2024 | Gaudreau | A63B 69/0026 |
| 2024/0197028 | A1 * | 6/2024 | Oumnia | A43B 3/34 |
| 2024/0261660 | A1 * | 8/2024 | Houlihan | A63B 71/0622 |
| 2024/0365455 | A1 * | 10/2024 | Elliott | H05B 47/115 |
| 2025/0001256 | A1 * | 1/2025 | Doeden | A63B 67/14 |

* cited by examiner

ICE HOCKEY PUCK, CHARGING DEVICE AND ICE HOCKEY PUCK KIT

CROSS-REFERENCE TO RELATED APPLICATIONS

The application claims priority of Chinese patent application CN2025217303486, filed on 2025 Aug. 13, which is incorporated herein by reference in its entirety.

TECHNICAL FIELD

The present invention relates to the field of sports equipment for ice hockey, in particular to an ice hockey puck, a charging device and an ice hockey puck kit.

BACKGROUND ART

With the promotion of the national fitness strategy, ice hockey has become a popular high-speed competitive sport, and more people have been joining this sport. The application scenarios of ice hockey are not limited to professional arenas, but also widely exist in youth training, amateur practice, and even street or non-standard ice environments.

However, for athletes or enthusiasts, it is difficult to track the position of existing ice hockey puck on the market in the evening or when the lighting is poor at night. This is because the ice hockey puck is relatively small and there are no signs on it to allow athletes or enthusiasts to track it. This makes it difficult to train or play, and causes inconvenience to users if they use ice hockey puck in the evening or when the lighting is poor at night.

SUMMARY

The main purpose of this present invention is to provide an ice hockey puck, a charging device and an ice hockey puck kit, aiming to improve the problem that it is difficult to track the ice hockey puck.

To achieve the above target, the technical solution adopted by the present invention is as follows.

The first aspect of the present invention provides an ice hockey puck.

The ice hockey puck includes a housing, and at least a portion of the housing is capable of transmitting light.

The ice hockey puck further includes a light-emitting device. The light-emitting device is arranged in the housing. The light-emitting device is capable of emitting light to the outside through a light-transmitting portion of the housing.

The ice hockey puck further includes a power source. The light-emitting device is electrically connected to the power source.

The ice hockey puck further includes a magnetic induction switch. The magnetic induction switch is arranged in the housing. The magnetic induction switch is electrically connected to the power source. The magnetic induction switch is configured for controlling conduction or cutoff of circuits between the light-emitting device and the power source according to changes of external magnetic field.

In the first embodiment, the light-emitting device includes a controller, a light-emitting element and a vibration sensor. The light-emitting element is electrically connected to the controller, and the vibration sensor is also electrically connected to the controller. The vibration sensor is configured for detecting vibration signals.

The controller is configured for controlling the light-emitting element to emit light or extinguish according to the vibration signals.

In the first embodiment, the ice hockey puck includes a copper charging pole. The copper charging pole is electrically connected to the power source device, and the copper charging pole is configured for charging the power source device.

In the first embodiment, the housing is provided with a mounting slot. The light-emitting device is arranged in the mounting slot. An adhesive layer is arranged between the light-emitting device and the mounting slot, and the adhesive layer is configured for waterproof and moisture resistance.

In the first embodiment, a bottom surface of the housing is provided with a first opening and a charging positioning hole. The charging positioning hole is configured for the positioning of the charging device. The first opening is in communication with the mounting slot. A first end of the copper charging pole and the first opening are connected to form a charging port, and a second end of the copper charging pole is electrically connected to the circuit board.

In the first embodiment, a side of the light-emitting device facing the charging port is provided with at least one light-emitting element. The light-emitting elements are distributed circumferentially around the circuit board.

In the first embodiment, the light-emitting device further includes a vibrating sensor. The vibrating sensor is electrically connected to the circuit board. When the vibrating sensor vibrates, the vibrating sensor is capable of driving the light-emitting element to emit light source.

In the first embodiment, the housing includes a counterweight cover. A top surface of the housing is provided with a groove. The groove is in communication with the mounting slot. The counterweight cover is detachably arranged on the groove and is configured for covering the groove.

In the first embodiment, the ice hockey puck further includes a fastener. The fastener includes a screw and a nut. The iron counterweight cover is provided with a first mounting hole, and the bottom surface of the housing is provided with a second mounting hole. The second mounting hole is configured for penetrating through the top surface and the bottom surface of the housing. The nut is installed in the second mounting hole. The screw is configured for passing through the first mounting hole and being inserted into the second mounting hole, and the screw is connected to the nut.

The second aspect of the present invention provides a charging device. The charging device includes a charging base. The charging base includes an upper housing, a lower housing and a polarity-agnostic charging circuit. The charging base is provided with the upper housing. The upper housing and the lower housing are configured for covering each other. A side of the upper housing opposite to the lower housing is provided with at least one first mounting column. A third mounting hole is defined in an end head of an end of the first mounting column facing the lower housing. A second mounting column opposite to the first mounting column is arranged in the lower housing. The second mounting column is connected to the third mounting hole. The lower housing is provided with a reinforcing rib. The reinforcing rib is configured for fixing the polarity-agnostic charging circuit.

In the first embodiment, the charging base further includes a charging pin. The charging pin is connected to the polarity-agnostic charging circuit. The lower housing is provided with a second opening and a charging positioning column.

The charging pin is inserted into the second opening, and a portion of the charging pin is positioned outside the lower housing.

The third aspect of the present invention provides an ice hockey puck kit. The ice hockey puck kit includes at least one ice hockey puck provided by the first aspect of the present invention, and at least one charging device provided by the second aspect of the present invention. The charging pin is connected to the copper charging pole to charge. The charging positioning column is detachably connected to the charging positioning hole.

In the technical solution of the present invention, the light-emitting device is arranged on the housing of the ice hockey puck, and the housing is made of transparent material. This enables light source of the light-emitting device to be cast onto the housing and makes an entire main body emit light, thereby enabling athletes or enthusiasts to clearly observe the ice hockey puck. Even when using the ice hockey puck in the evening or in low light environments, athletes or enthusiasts can track the position of the ice hockey puck through the light source, which significantly improves the usage environment and applicability of the ice hockey puck. In addition, the magnetic induction switch is arranged on the ice hockey puck. The magnetic induction switch is configured for controlling conduction or cutoff of the circuits between the light-emitting device and the power source according to changes in the external magnetic field. Thus, the power consumption problem of the ice hockey puck when not in use is effectively solved, and the service life of the device is extended.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
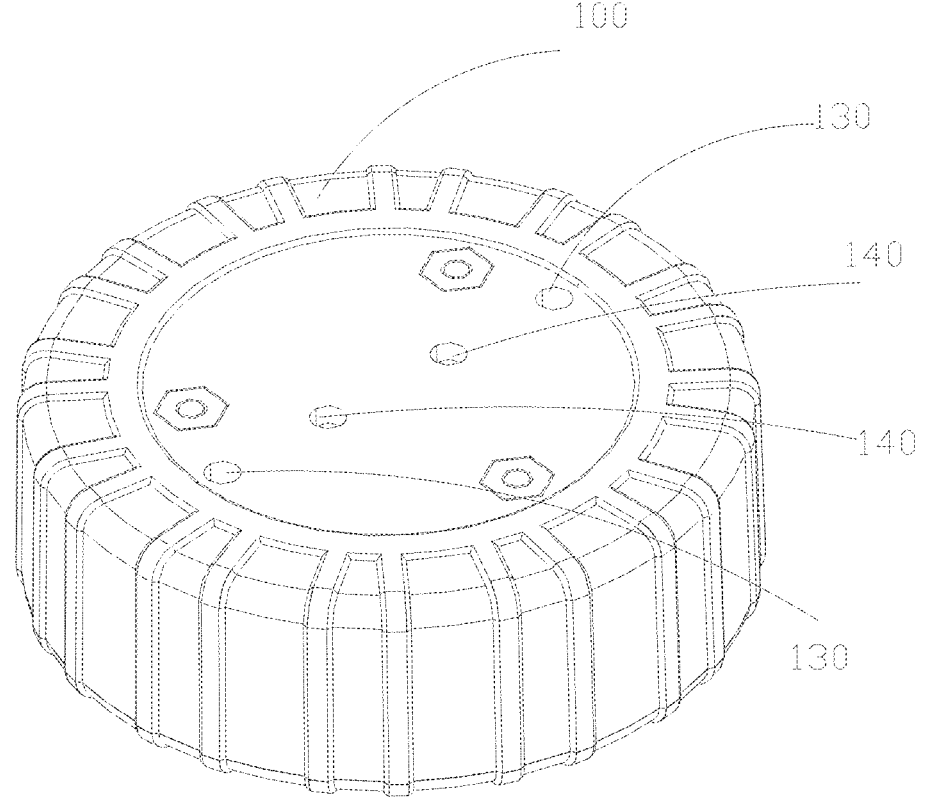
FIG. 1 is a structure diagram of the ice hockey puck provided by the present invention.
Figure 2:
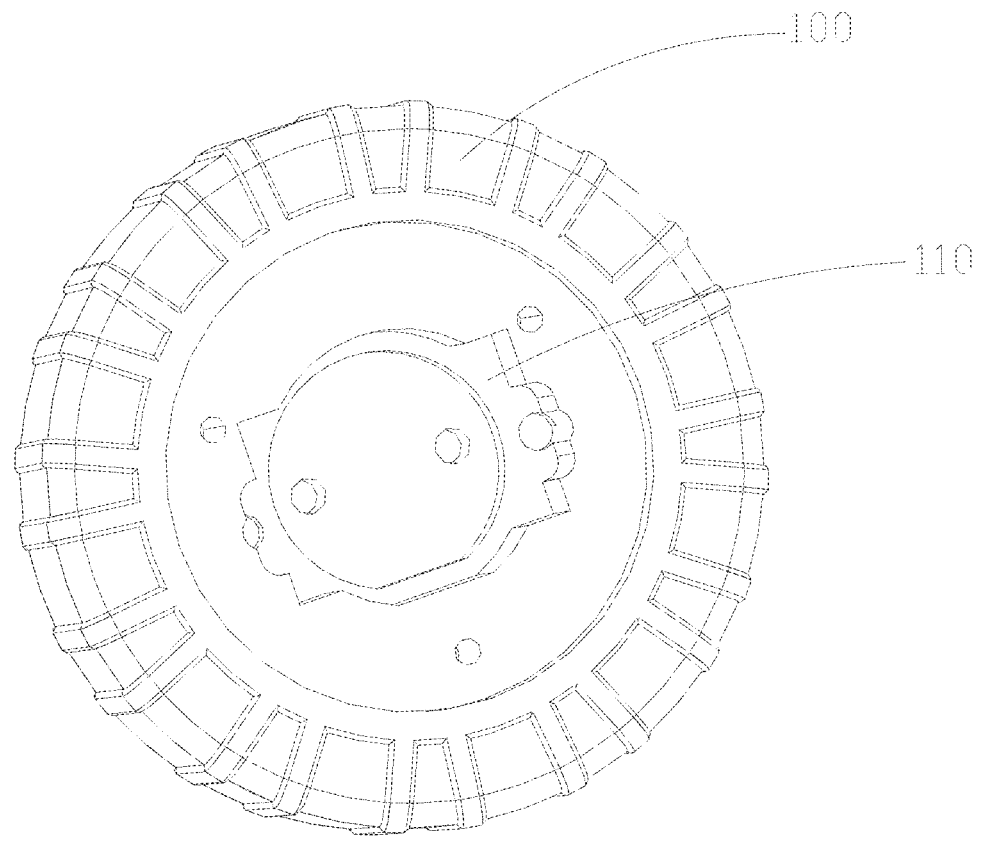
FIG. 2 is a structure diagram of the housing of the ice hockey puck by the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

The present invention provides an ice hockey puck.

Referring to FIG. 1 to FIG. 4, according to the embodiment of the present invention, the ice hockey puck includes a housing 100, a light-emitting device 200, a power source 300 and a magnetic induction switch 400.

At least a portion of the housing 100 is capable of transmitting light. The light-emitting device 200 is arranged in the housing 100. The light-emitting device 200 is capable of emitting light to the outside through a light-transmitting portion of the housing 100. The light-emitting device 200 is electrically connected to the power source 300. The magnetic induction switch 400 is arranged in the housing 100. The magnetic induction switch 400 is electrically connected to the power source 300. The magnetic induction switch 400 is configured for controlling conduction or cutoff of circuits between the light-emitting device 200 and the power source 300 according to changes of external magnetic field.

In this embodiment, the housing 100 of the ice hockey puck is configured for being made of light-transmitting material. The light-transmitting material is preferably to be translucent polyurethane material. The translucent polyurethane material is capable of achieving a low temperature resistance effect, so that the ice hockey puck can work normally at a temperature of −30°. The surface of the ice hockey puck is sanded to achieve a more uniform and beautiful luminous effect, and patterns on the surface printed by UV is more beautiful and wear-resistant.

The combination of the light-transmitting housing 100 and the light-emitting device 200 enables the ice hockey puck to be observed in dark environment, thereby enhancing the use experience at night or in low light environment. The ice hockey puck is further provided with the power source 300, and the power source 300 is configured for supplying power for the light-emitting device 200. In order to avoid power consumption of the ice hockey puck in an unused state, the magnetic induction switch 400 is arranged in the housing 100. The magnetic induction switch 400 is electrically connected to the power source 300. By making an external magnetic object 600 approach the ice hockey puck, the ice hockey puck is capable of automatically controlling the light emitting state when the external magnetic field changes, thereby increasing the interactivity and interest.

In the first embodiment, the light-emitting device 200 includes a controller 210, a light-emitting element 220, a vibration sensor 230 and a circuit board 240. The light-emitting element 220 is electrically connected to the controller 210, and the vibration sensor 230 is also electrically connected to the controller 210. The vibration sensor 230 is configured for detecting vibration signals. The controller 210 is configured for controlling the light-emitting element 220 to emit light or extinguish according to the vibration signals.

In this embodiment, the controller 210, the light-emitting element 220 and the vibration sensor 230 are all integrated on the circuit board 240, and are all electrically connected together. The vibration sensor 230 is configured for detecting the motion state of the ice hockey puck. When the ice hockey puck is hit or moved, a signal is transmitted to the controller 210. The controller 210 is configured for controlling an open state and a closed state of the light-emitting element 220, thereby achieving emitting light or extinguishing. Through the combination between the vibration sensor 230 and the controller 210, the ice hockey puck is capable of automatically emitting light during the movement process. This significantly enhances the visual appeal and user experience of the game, making the game more vivid and enjoyable.

Some ice hockey pucks adopt a disposable power supply design, which requires complete replacement once the electricity is depleted. This not only increases the cost of use but also generates a significant amount of waste, which is not in line with environmental protection principles.

In the first embodiment, the ice hockey puck includes a copper charging pole 250. The copper charging pole 250 is electrically connected to the power source 300, and the copper charging pole 250 is configured for charging the power source device 300.

In this embodiment, when the power of the ice hockey puck is insufficient, just connect an external charging device with the copper charging pole, and the electric current can flow smoothly into the power source device through the copper charging pole. After the charging is completed, the ice hockey puck can be restored to the using state. It is more durable to use the copper charging pole to charge than to use ordinary charging ports, and the overall coordination of ice hockey puck is thereby made to be more firm.

The durability of the copper charging pole enables an overall structure of the ice hockey puck to coordinate more firmly. This reduces faults caused by the damage of charging components, and extends service life of the ice hockey puck. At the same time, through repeated charging, the ice hockey puck is made to continue operating, thereby avoiding resource consumption and waste generation caused by frequent replacement of the ice hockey puck. Moreover, this faithfully implements environmental protection concepts, and reduces the cost of long-term use.

There are two copper charging poles. The copper charging poles are electrically connected to the power source device 300, and are configured for charging the power source device 300. This charging mode is more convenient and stable, and the charging is fast. The copper charging poles

250 are seamlessly connected to the main body, and it is not necessary to make glue injection.

In the first embodiment, the housing 100 is provided with a mounting slot 110. The light-emitting device 200 is arranged in the mounting slot 110. An adhesive layer is arranged between the light-emitting device 220 and the mounting slot 110, and the adhesive layer is configured for waterproof and moisture resistance.

In this embodiment, the mounting slot 110 is arranged at a middle portion of the housing 100, and the light-emitting device 200 is fixed in the mounting slot 110. In order to ensure that the light-emitting device 200 is stable without shaking when the ice hockey puck is moving, the adhesive layer is arranged between the light-emitting device 200 and the mounting slot 110. The liquid polyurethane adhesive is injected through the glue filling process, so that the light-emitting device 200 is completely wrapped and is bonded with a main body of the housing 100. This significantly improves the impact resistance, moisture-resistant sealing performance and installation stability of the device.

In the first embodiment, a bottom surface of the housing 100 is provided with a first opening 120 and a charging positioning hole 130. The charging positioning hole 130 is configured for the positioning of the charging device 700. The first opening 120 is in communication with the mounting slot 110. A first end of the copper charging pole 250 and the first opening 120 are connected to form a charging port 140, and a second end of the copper charging pole 250 is electrically connected to the circuit board 240.

In this embodiment, since there are two copper charging poles 250 and two corresponding first openings 120. The first end of the copper charging pole 250 is connected to the circuit board 240, and the second end of the copper charging pole 250 is aligned with the first opening 120 to form the charging port 140. The charging positioning hole 130 of the housing 100 is used for the positioning of the charging device 700. Through the structure of the first opening 120 and the charging positioning hole 130, the accurate positioning and connection of the charging port 140 is realized. This design not only improves the stability and reliability of the charging port 140, but also improves the convenience and safety of using the ice hockey puck.

In the first embodiment, a side of the light-emitting device 200 facing the charging port 140 is provided with at least one light-emitting element 220. The light-emitting elements 220 are distributed circumferentially around the circuit board 240.

In this embodiment, the light-emitting device 200 is provided with the light-emitting element 220. The light emitting element 220 can be a light strip, a light bead, a light bulb, and the like. Preferably, in this embodiment, the LED light bead is used as the light-emitting element 220. A plurality of LED light beads are circumferentially distributed around the circuit board 240. The first purpose is to balance the weight around the ice hockey puck, and the second purpose is to make the light source more uniform when the light source of the light-emitting device 200 is cast on the main body. LED has low power consumption and long service life, which can reduce labor costs and replacement costs. LED light beads do not contain harmful substances such as mercury, and are environmentally friendly. Meanwhile, the light-emitting device is capable of emitting light sources of different colors, so as to improve children's interest in ice hockey games.

In the first embodiment, the housing 100 includes a counterweight cover 150. A top surface of the housing 100 is provided with a groove 160. The groove 160 is in communication with the mounting slot 110. The counterweight cover 150 is detachably arranged on the groove 160 and is configured for covering the groove 160.

In this embodiment, the main body of the housing 100 includes the counterweight cover 150. The counterweight cover 150 is detachably arranged in the groove 160 on the top surface of the housing 100. The counterweight cover 150 has a certain weight, which can make the ice hockey puck keep balanced and not easy to roll over. This not only improves the balance and stability of the ice hockey puck, but also facilitates installation and disassembly of the light-emitting device 200.

In the first embodiment, the ice hockey puck further includes a fastener 170. The fastener 170 includes a screw 171 and a nut 172. The iron counterweight cover 150 is provided with a first mounting hole 151, and the bottom surface of the housing 100 is provided with a second mounting hole 152. The second mounting hole 152 is configured for penetrating through the top surface and the the bottom surface of the housing 100. The nut 172 is installed in the second mounting hole 152. The screw 171 is configured for passing through the first mounting hole 151 and being inserted into the second mounting hole 152, and the screw 171 is connected to the nut 172.

In this embodiment, the ice hockey puck also uses the screw 171 and the nut 172 to assist in fixing the light-emitting device 200. Specifically, the counterweight cover 150 is provided with the first mounting hole 151, and the bottom surface of the housing 100 is correspondingly provided with the second mounting hole 152. During assembly, the screw 171 is configured for sequentially passing through the first mounting hole 151 and the second mounting hole 152 and then being locked with the nut 172, thereby tightly fixing the counterweight cover 150 on the housing 100. This not only simplifies the assembly process of the housing 100 and the counterweight cover 150, but also significantly improves the stability of a connection between the housing 100 and the counterweight cover 150.

Figure 3:
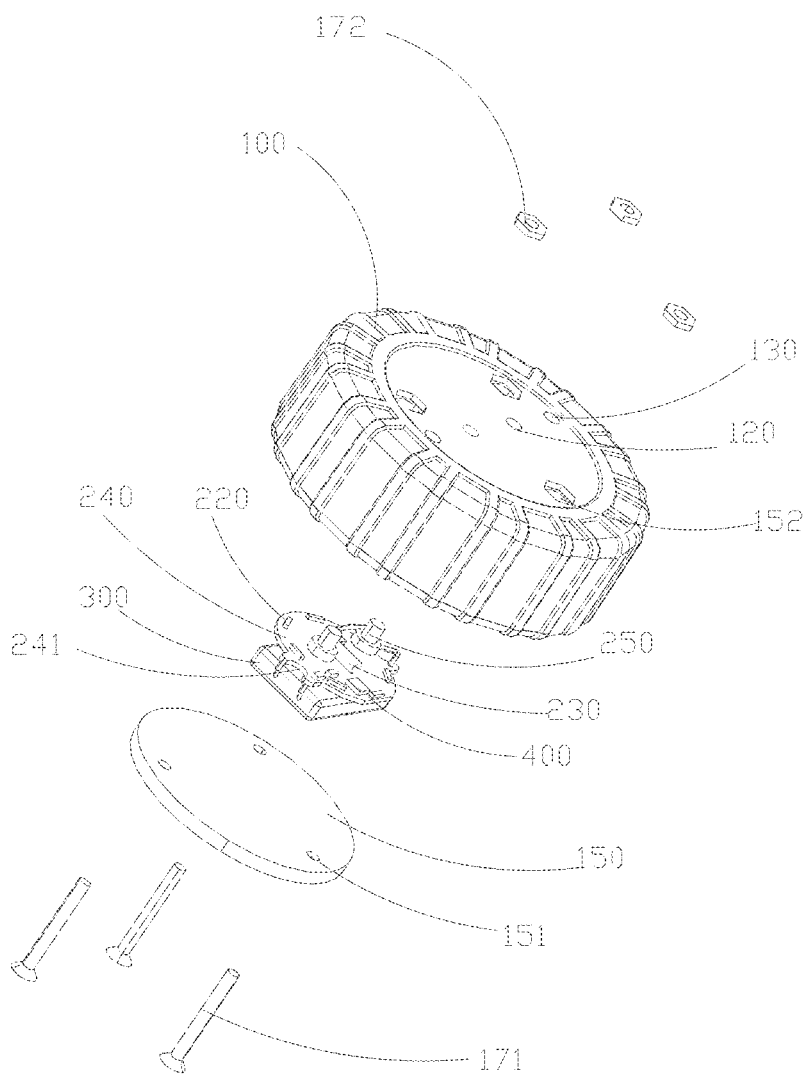
FIG. 3 is an exploded view of the ice hockey puck provided by the present invention.
Figure 4:
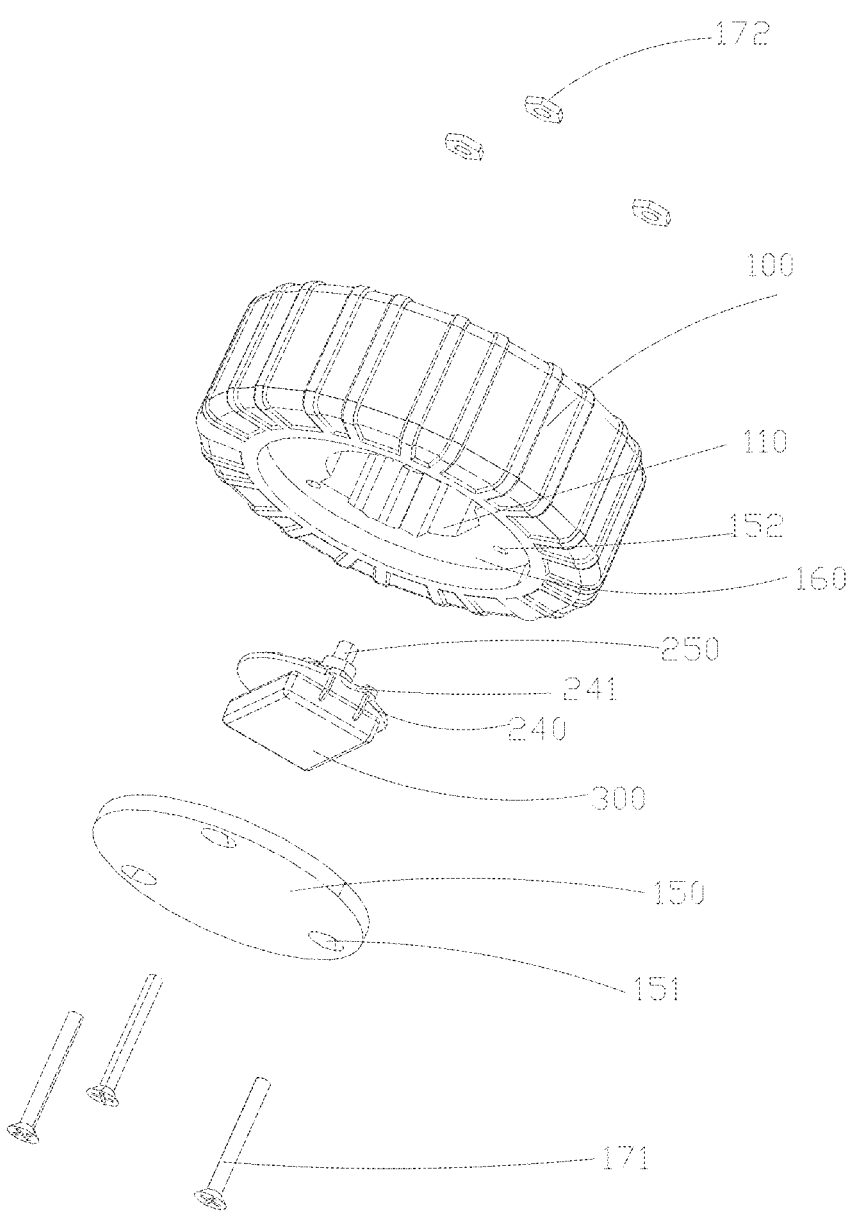
FIG. 4 is another perspective of the exploded view of the ice hockey puck provided by the present invention.
Figure 8:
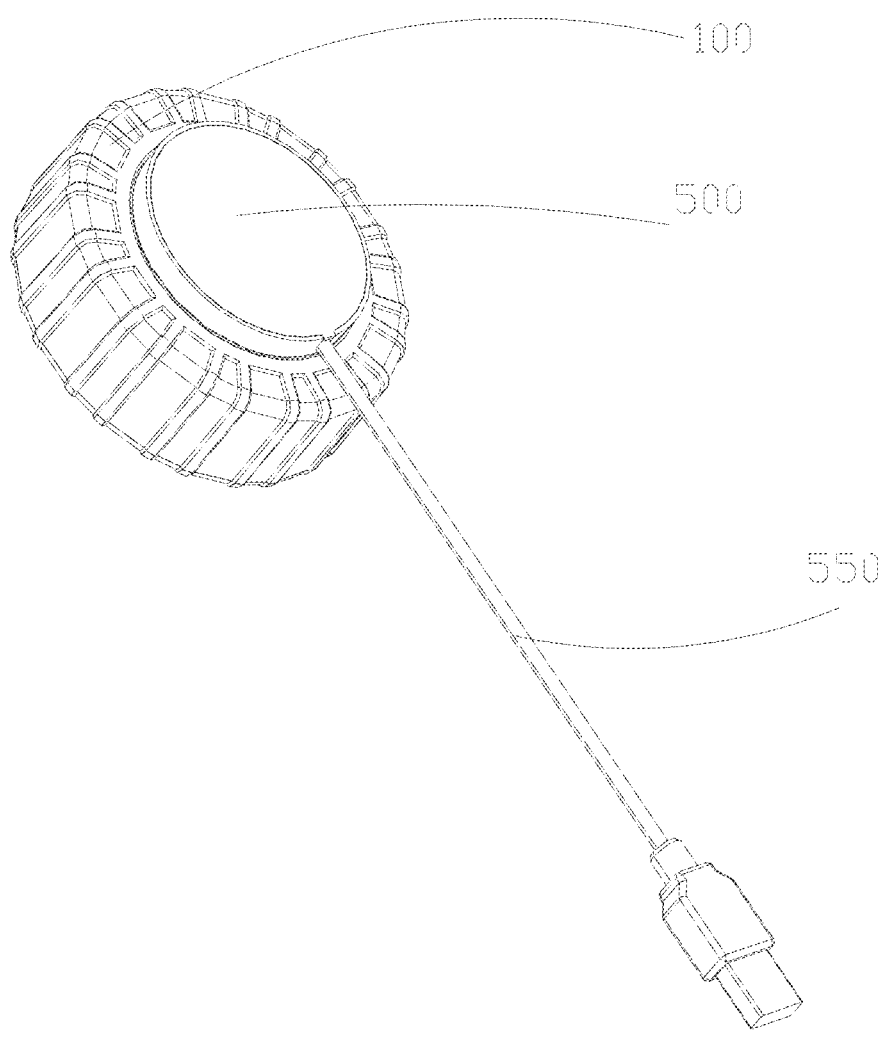
FIG. 8 is another perspective of the structure of the ice hockey puck kit provided by the present invention.

Moreover, referring to FIG. 3 and FIG. 8, the mounting slot 110 is provided with a third mounting column 180. The circuit board 240 is provided with at least one positioning slot 241. When the circuit board 240 is installed in an inner cavity of the housing 100, accurate positioning is achieved through the engaged coordination of the third mounting column 180 and the positioning slot 241, thereby further enhancing a fixing effect of the light-emitting device 200.

Figure 5:
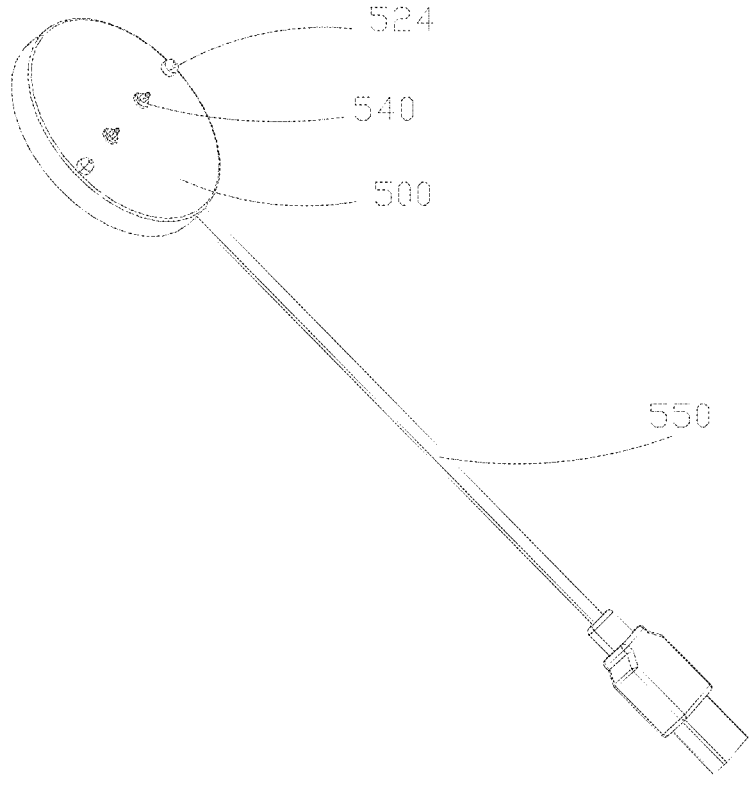
FIG. 5 is a structure diagram of the charging device provided by the present invention.
Figure 6:
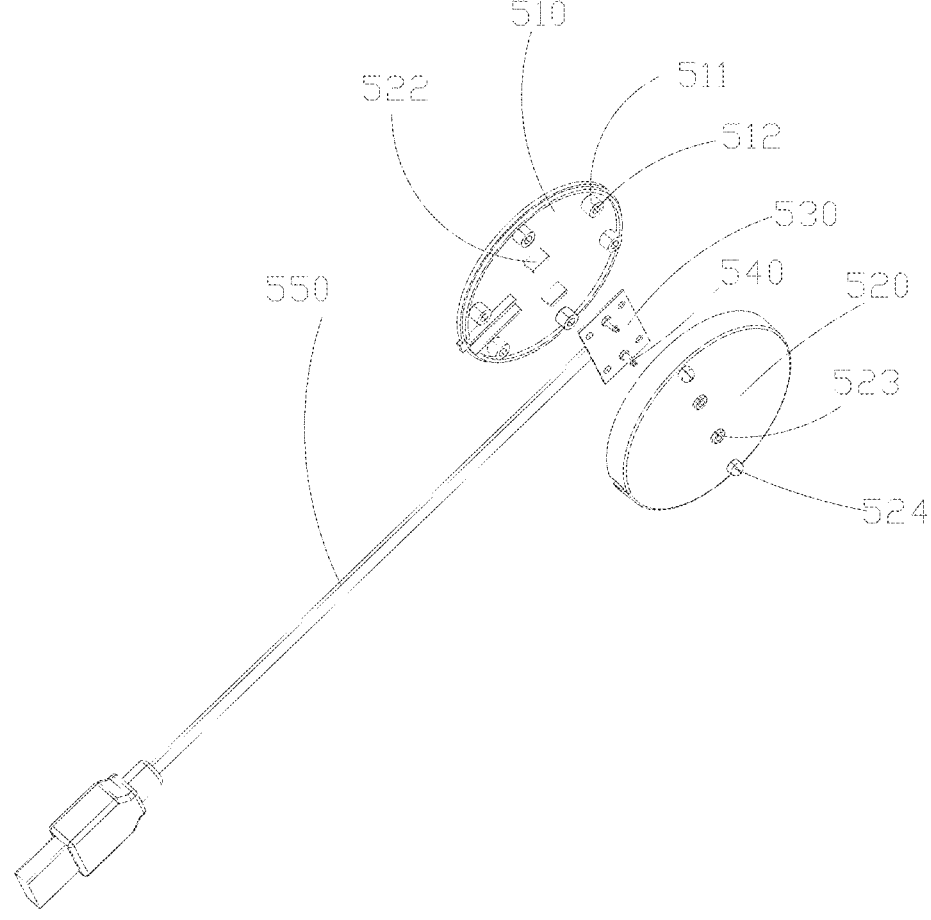
FIG. 6 is an exploded view of the charging device provided by the present invention.
Figure 7:
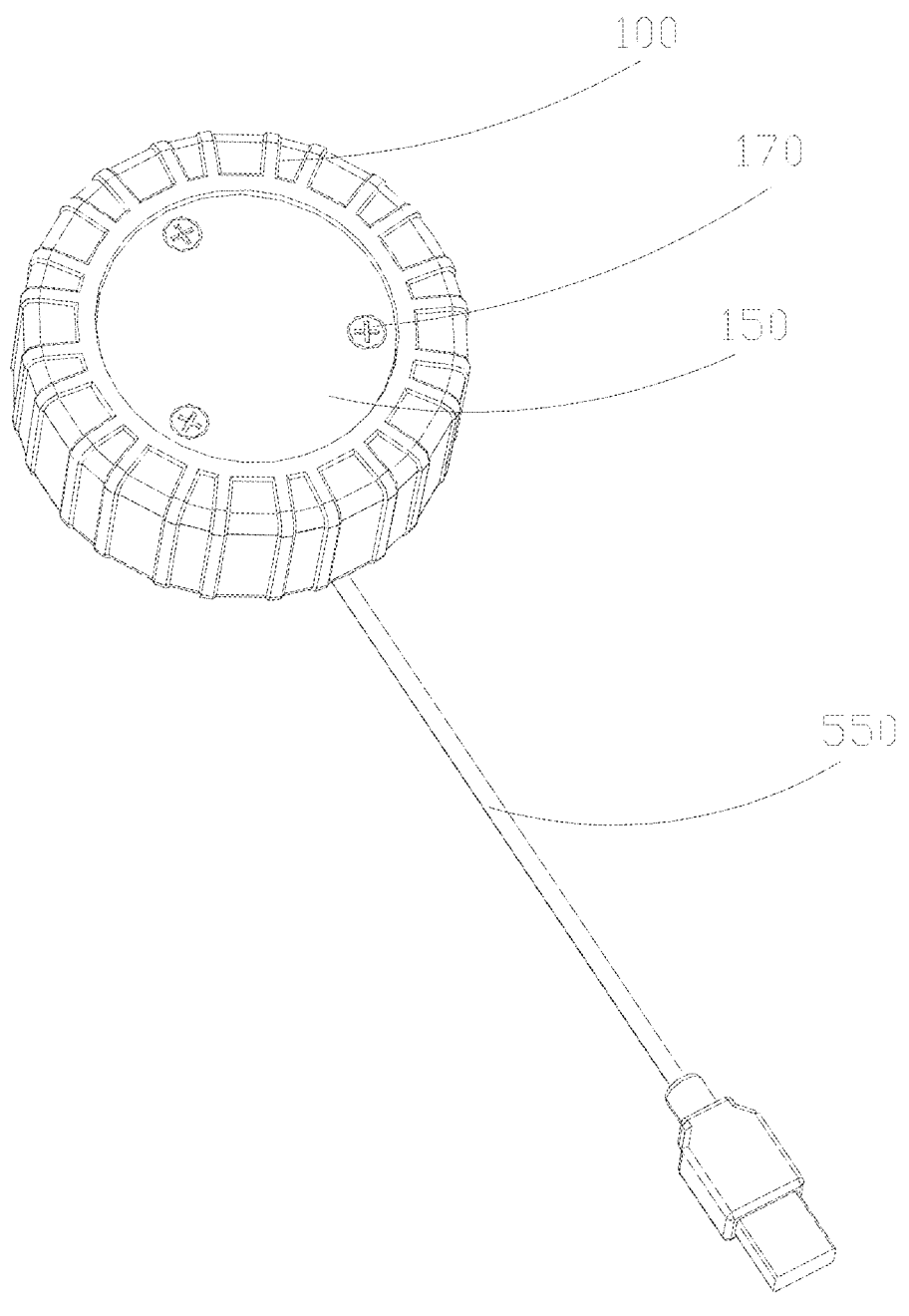
FIG. 7 is a structure diagram of the ice hockey puck kit provided by the present invention.

Referring to FIG. 5 to FIG. 7, the present invention further provides a charging device. The charging device includes a charging base 500. The charging base 500 includes an upper housing 510, a lower housing 520 and a polarity-agnostic charging circuit 530. The upper housing 510 and the lower housing 520 are configured for covering each other. A side of the upper housing 510 opposite to the lower housing 520 is provided with at least one first mounting column 511. A third mounting hole 512 is defined in an end head of an end of the first mounting column 511 facing the lower housing 520. A second mounting column 521 opposite to the first mounting column 511 is arranged in the lower housing 520. The second mounting column 521 is connected to the third mounting hole 512. The lower housing 520 is provided with a reinforcing rib 522. The reinforcing rib 522 is configured for fixing the polarity-agnostic charging circuit 530.

In this embodiment, the upper housing 510 and the lower housing 520 are mutually interlocked and are covered by each other via the first mounting column 511 and the second mounting column 521. The third mounting hole 512 on the end head of the first mounting column 511 is engaged with a protrusion on a top end of the second mounting column 521, and the upper housing 510 is locked with the lower housing 520 without additional screw 171. The polarity-agnostic charging circuit 530 is arranged in the inner cavity of the lower housing 520. The reinforcing rib 522 grid is configured for clamping and fixing around the polarity-agnostic charging circuit 530, and accurately aligning with a mounting position of a charging pin 540.

In the first embodiment, the charging base 500 further includes a charging pin 540. The charging pin 540 is connected to the polarity-agnostic charging circuit 530. The lower housing 520 is provided with a second opening 523 and a charging positioning column 524. The charging pin 540 is inserted into the second opening 523, and a portion of the charging pin 540 is positioned outside the lower housing 520.

In this embodiment, the charging pin 540 is inserted into the second opening 523 of the lower housing 520, a portion of the charging pin 540 is positioned outside the lower housing 520, and the charging positioning column 524 is connected to the ice hockey puck. This improves the accuracy and stability of charging. The charging base 500 also includes a charging cable 550. The charging cable 550 is configured for transmitting electrical current by connecting with the external power source 300. The charging cable 550 is enabled to achieve electrical connection with external devices through the charging pin 540, thereby improving the convenience and efficiency of use.

Figure 9:
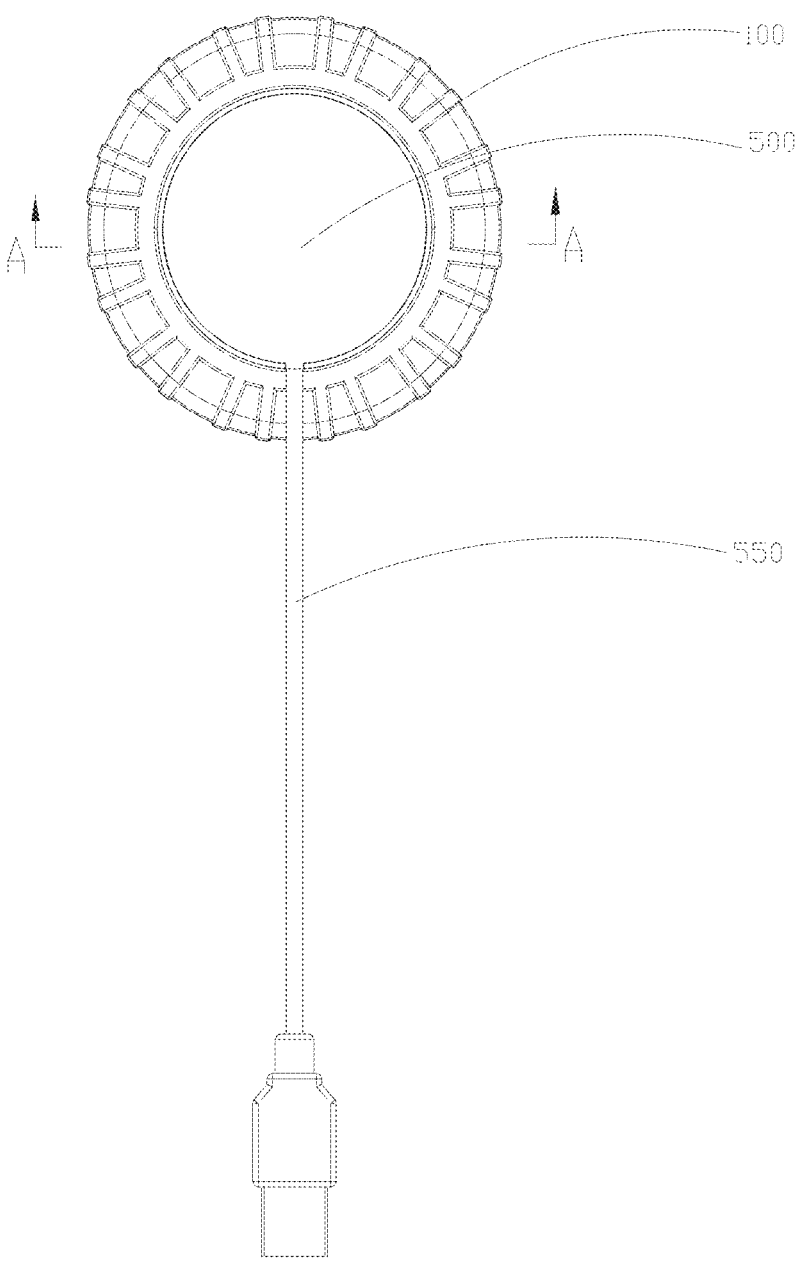
FIG. 9 is a vertical view of the ice hockey puck kit provided by the present invention.
Figure 10:
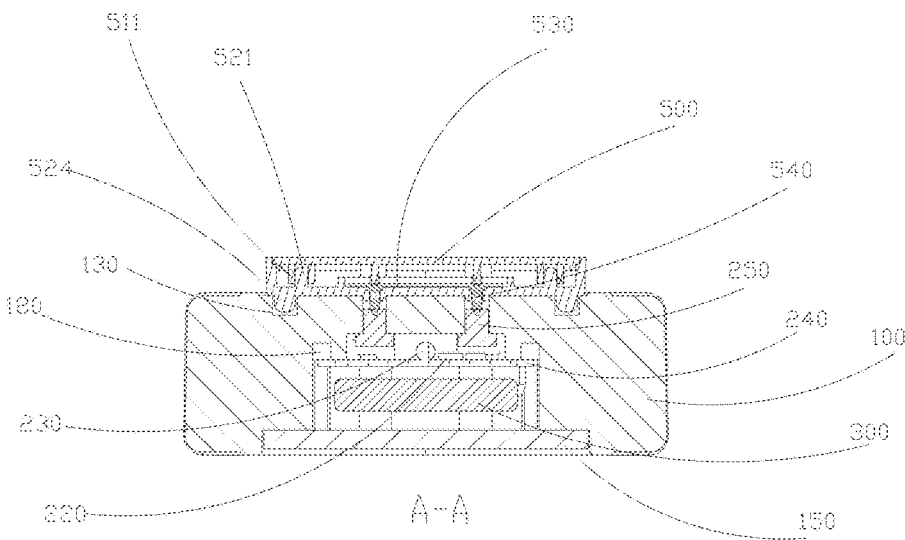
FIG. 10 is a sectional view along the A-A direction of the ice hockey puck kit provided by the present invention.
Figure 11:
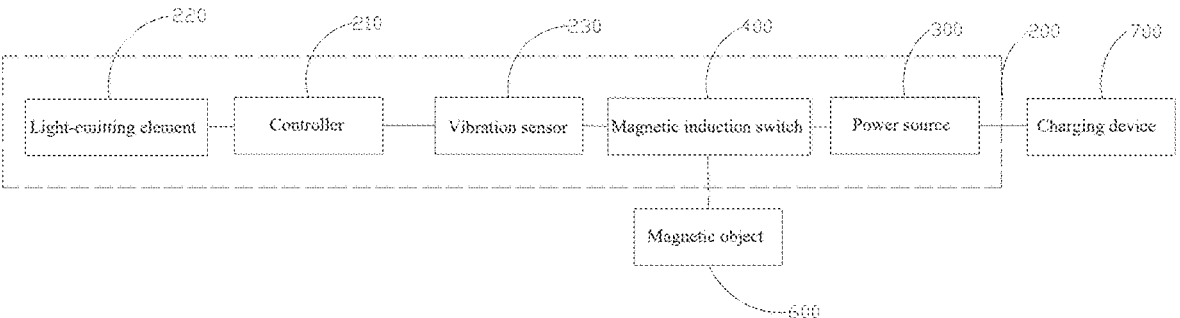
FIG. 11 is a logic diagram of the circuit of the ice hockey puck provided by the present invention.

Referring to FIG. 8 to FIG. 10, the present invention further provides an ice hockey puck kit. The ice hockey puck kit includes the ice hockey puck in the above-mentioned embodiments and the charging device in the above-mentioned embodiments. The specific structure of the ice hockey puck and the charging device refers to the above-mentioned embodiments. Since the ice hockey puck kit adopts all the technical solutions of all the above-mentioned embodiments, the ice hockey puck kit at least has all the beneficial effects brought by the technical solutions of the above-mentioned embodiments, and the beneficial effects will not be repeated here.

In the first embodiment, the charging pin 540 is connected to the copper charging pole 250 to charge. The charging positioning column 524 is detachably connected to the charging positioning hole 130.

In this embodiment, by achieving an electrical connection between the charging pin 540 and a contact surface of the copper charging pole 250, a charging function is thereby realized. The charging pin 540 on the charging base 500 can casually contact the copper charging pole 250 of the ice hockey puck, so as to achieve charging without finding the charging direction complicatedly. When the ice hockey puck needs to be charged, place the ice hockey puck on the charging base 500, and then slightly rotate the charging positioning column 524, so that the charging positioning hole 130 on the ice hockey puck is stuck. After the charging is completed, the ice hockey puck can be taken away directly without unplugging the charger complicatedly. The charging positioning column 524 is engaged with the charging positioning hole 130, so as to prevent power failure due to careless touch during charging, thereby improving the charging efficiency. The connection mode between the charging pin 540 and the copper charging pole 250, and the detachable connection between the charging positioning column 524 and the charging positioning hole 130 not only improve the stability and reliability of the charging port 140, but also improve the using convenience and maintenance efficiency of the device.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. An ice hockey puck, comprising:

a housing, at least a portion of the housing being capable of transmitting light, the housing being provided with a mounting slot;

a light-emitting device, the light-emitting device being arranged in the housing, and the light-emitting device being capable of emitting light to the outside through a light-transmitting portion of the housing;

a power source, the light-emitting device being electrically connected to the power source; and a magnetic induction switch, the magnetic induction switch being arranged in the housing, wherein the magnetic induction switch is electrically connected to the power source, and the magnetic induction switch is configured for controlling conduction or cutoff of circuits between the light-emitting device and the power source according to changes of external magnetic field;

wherein the ice hockey puck comprises a copper charging pole, the copper charging pole is electrically connected to the power source device, and the copper charging pole is configured for charging the power source device;

wherein a bottom surface of the housing is provided with a first opening and a charging positioning hole, the charging positioning hole is configured for positioning of a charging device, the first opening is in communication with the mounting slot, a first end of the copper charging pole and the first opening are connected to form a charging port, and a second end of the copper charging pole is electrically connected to a circuit board.

2. The ice hockey puck according to claim 1, wherein the light-emitting device comprises a controller, a light-emitting element and a vibration sensor, the light-emitting element is electrically connected to the controller, the vibration sensor is electrically connected to the controller, the vibration sensor is configured for detecting vibration signals, and the controller is configured for controlling the light-emitting element to emit light or extinguish according to the vibration signals.

3. The ice hockey puck according to claim 1, wherein the light-emitting device is arranged in the mounting slot, an adhesive layer is arranged between the light-emitting device and the mounting slot, and the adhesive layer is configured for waterproof and moisture resistance.

4. The ice hockey puck according to claim 3, wherein the adhesive layer completely wraps the light-emitting device within the mounting slot.

5. The ice hockey puck according to claim 1, wherein a side of the light-emitting device facing the charging port is provided with at least one LED lamp, and the at least one LED lamp are distributed circumferentially around the circuit board.

6. The ice hockey puck according to claim 1, wherein the housing comprises a counterweight cover, a top surface of the housing is provided with a groove, the groove is in communication with the mounting slot, and the counterweight cover is detachably arranged on the groove and is configured for covering the groove.

7. The ice hockey puck according to claim 6, wherein the ice hockey puck further comprises a fastener, the fastener comprises a screw and a nut, the counterweight cover is provided with a first mounting hole, the bottom surface of the housing is provided with a second mounting hole, the second mounting hole is configured for penetrating through the top surface and the bottom surface of the housing, the nut is installed in the second mounting hole, the screw is configured for passing through the first mounting hole and being inserted into the second mounting hole, and the screw is connected to the nut.

8. The ice hockey puck according to claim 1, wherein the mounting slot is provided with a third mounting column, the circuit board is provided with at least one positioning slot, and the circuit board is installed in an inner cavity of the housing by engaging the third mounting column with the at least one positioning slot.

9. The ice hockey puck according to claim 1, wherein the housing is made of light-transmitting material.

10. The ice hockey puck according to claim 1, comprising two copper charging poles, wherein the bottom surface of the housing is provided with two first openings, each first opening being connected to a first end of a respective copper charging pole to form two charging ports.

11. The ice hockey puck according to claim 1, wherein the housing is made of a translucent polyurethane material capable of normal operation at a temperature of −30°.

* * * * *